United States Patent [19]

Bennett et al.

[11] Patent Number: 4,853,051

[45] Date of Patent: Aug. 1, 1989

[54] PROPELLANT BINDER PREPARED FROM A PCP/HTPB BLOCK POLYMER

[75] Inventors: S. John Bennett, Brigham City, Utah; Michael W. Barnes, Warrenton, Va.; Kenneth J. Kolonko, Brigham City, Utah

[73] Assignee: Morton Thiokol, Inc., Chicago, Ill.

[21] Appl. No.: 191,807

[22] Filed: May 5, 1988

Related U.S. Application Data

[62] Division of Ser. No. 927,895, Nov. 6, 1986, abandoned.

[51] Int. Cl.⁴ ............................................. C06B 45/10
[52] U.S. Cl. .................................. 149/19.4; 149/19.5; 149/19.19
[58] Field of Search ............... 149/19.4, 19.5, 19.9

[56] References Cited

U.S. PATENT DOCUMENTS

| | | | |
|---|---|---|---|
| 4,156,700 | 5/1979 | Tremblay et al. | 149/19.9 |
| 4,281,087 | 7/1981 | Heuschen et al. | 525/386 |
| 4,394,329 | 7/1983 | Barnes | 149/19.4 |
| 4,430,131 | 2/1984 | Tremblay | 149/19.4 |
| 4,535,277 | 11/1985 | Scribner | 149/19.4 |
| 4,536,235 | 8/1985 | Lelu et al. | 149/19.4 |
| 4,775,432 | 10/1988 | Kolonko et al. | 149/19.4 |

OTHER PUBLICATIONS

Schindler, A., et al., *J. of Polymer Science* 20 (1982), pp. 319–326.

*Primary Examiner*—Edward A. Miller
*Attorney, Agent, or Firm*—Wayne E. Nacker; Gerald K. White

[57] ABSTRACT

Binders for propellants for the like comprise elastomers which are based on block copolymers in which a pair of poly(caprolactone) blocks flank a central hydroxyl-terminated poly(butadiene) block. The block polymers are cured with isocyanates through the OH termini of the poly(caprolactone) blocks. The elastomers have inherent energies and other characteristics intermediate those of PCP and HTPB and have good compatibility with nitrate ester plasticizers.

6 Claims, 1 Drawing Sheet

PROPELLANT BINDER PREPARED FROM A PCP/HTPB BLOCK POLYMER

This is a divisional of copending application Ser. No. 927,895 filed on Nov. 6, 1986 now abandoned.

The present invention is directed to block polymers of polycaprolactone and hydroxyl-terminated polybutadiene, the block polymers are useful for forming binders in high-energy compositions, such as propellants, explosives, gasifiers or the like.

BACKGROUND OF THE INVENTION

Various polymeric materials have been proposed as binders for high-energy materials, such as solid propellants, explosives, gasifiers of the like. A variety of elastomeric materials have found specific applications in high-energy compositions. Binders are elastomeric materials which spatially immobilize particulates of high-energy material, including fuel material particulates and oxidizer particulates. In many cases, the propellant or explosive formulation also includes a high-energy liquid plasticizer, particularly nitrate ester plasticizers such as nitroglycerin (NG), butane triol trinitrate (BTTN), and trimethylolethane trinitrate (TMETN). High-energy plasticizers contribute to the elastomeric properties of the binder and also contribute to the energy value of the propellant or explosive system. If the propellant or explosive formulation includes a plasticizer, the binder selected must be compatible with the plasticizer in order to spatially immobilize the same; that is, ensure that the plasticizer does not flow and settle from the high-energy composition.

One type of polymeric material commonly used to produce binders is unsaturated hydrocarbon polymers, such as polybutadiene. Although hydrocarbon binders are inherently relatively high in energy, they do not retain nitrate esters; and therefore, propellants having hydrocarbon binders are generally characterized as having relatively low energy. Propellants having hydrocarbon binders are further characterized by relatively low burning rate slopes, relatively low temperature sensitivities and relatively low hazards sensitivities. Hydrocarbon binders are typically loaded with high solids (fuel and oxidizer) content.

Binders based upon polyethers or polyesters, such as polycaprolactone (PCP), retain nitrate esters; therefore, propellants can be produced from these binders having relatively high energies. Ether and, particularly, ester bonds, however, inherently reduce the energy of these binder systems. Thus, a propellant material including a PCP binder may have a high energy, primarily due to the high retention of nitrate ester plasticizer by the PCP elastomeric material, in spite of the inherently relatively low energy of the PCP elastoxer. Propellants having nitrate ester-plasticized polyether or Polyester binders are further characterized by relatively high burning rate slopes, relatively high temperature sensitivities and relatively high hazard sensitivities.

It is a continuing goal to provide higher energy binder systems for high-energy materials, particularly propellants. Furthermore, specific propellant or explosive applications optimally require particular combinations of characteristics, e.g., burn rate slopes, temperature sensitivities and hazards sensitivities, and the need exists for binders which can be used to tailor propellant or explosive formulations to the optimal requirements of specific applications.

SUMMARY OF THE INVENTION

Polycaprolactone (PCP)/hydroxyl-terminated polybutadiene (HTPB) block polymers are prepared and used to form elastomeric binders for propellants, explosives, gasifiers of the like. The block polymers comprise a central block of polybutadiene and flanking blocks of PCP. The block polymers are prepared from HTPB and caprolactone (CL) monomers through ring-opening polymerization of CL, which s initiated at the hydroxyl termini of the HTPB. The PCP blocks comprise between about 30 and about 70 wt. percent of the block polymer. The inherent energies of the block polymers are intermediate the inherent energies of polybutadiene and PCP, yet retain the nitrate-ester compatibility of PCP, thereby enabling higher energy, nitrate ester-plasticized compositions to be produced. The polymer having characteristics of both butadiene and PCP can be tailored to provide more optimal characteristics to high-energy compositions for particular purposes.

DETAILED DESCRIPTION OF CERTAIN PREFERRED EMBODIMENTS

Figure 1:
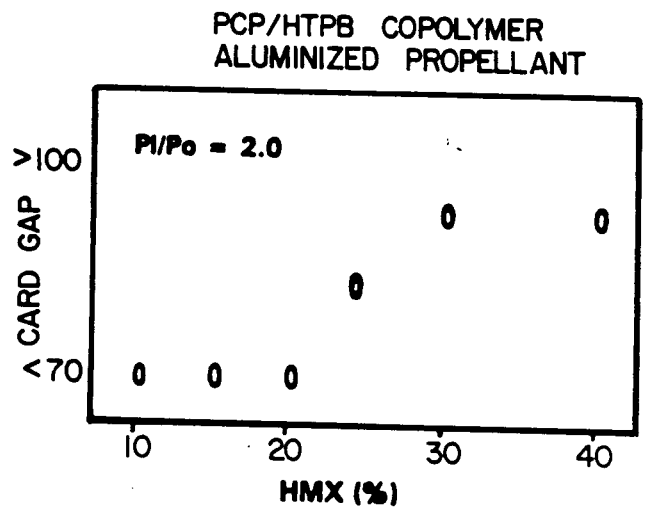
FIG. 1 is a graph representing hazards properties of a propellant formulation which is based upon a PCP/HTPB copolymer in accordance with the invention, as a function of solids (HMX) loading.

In accordance with the invention, t,lock copolymers are produced in which a butadiene block derived from HTPB is flanked by polycaprolactone blocks. The block polymer is curable by conventional means, e.g., with isocyanates, to form elastomeric materials suitable as binders for high-energy systems, such as gasifiers, explosives, and particularly propellants. The binders formed from the block polymers have properties of both the PCP and the butadiene blocks. The block polymers have higher energies than PCP as a result of the butadiene block; nevertheless, binders produced from the block polymers retain the nitrate ester-compatibility afforded by the PCP blocks, thereby enabling high-energy, nitrate ester-plasticized binder systems to be produced. Other characteristics of the block polymer-based binders are tailorable by adjusting the relative weight percentages of the PCP and butadiene blocks.

The block polymers are prepared from previously prepared HTPB, including commercially available HTPB's, and CL monomers by ring opening polymerization of the CL monomers for which the HTPB provides the initiating hydroxyl groups. Ring opening polymerization is described, for example, in *J. of Polymer Science* 20 219-326 (1982). An alcoholic hydroxyl group opens the ring, forming a ψ-hydroxy ester with a CL monomer, and chain propagation continues with the ψ-hydroxyl group esterfying an additional CL monomer. Polymerization proceeds slowly in the absence of a catalyst; and therefore, a catalyst, such as stannous octoate, is generally used to promote polymerization at an appreciable rate. Elevated temperatures enhance the rate of polymerization.

Whereas, relatively low molecular weight polymers are generally used to produce PCP's, in which case the alcohol initiator comprises only a very minor proportion of the PCP polymer; in the block polymer of the present invention, the HTPB which acts as the alcohol initiator is selected having a molecular weight (number average) of between about 1000 and about 5000 and preferably between about 2000 and about 4000. Generally, it is preferred that the polydispersity of the HTPB be no greater than about 2.0 so that block polymers of reasonably equal size can be produced. The mechanism of chain elongation is the same as chain elongation starting with smaller alcohol molecules as initiators, and polymerization of the PCP is promoted by catalysts, such as stannous octoate, metal alkoxides and metal amides. Polymerization is promoted by elevated temperatures, preferably between about 110° and about 150° C.

Polymerization of PCP chains continues until the availability of PCP monomers is substantially exhausted, e.g., about 99% exhausted. Average chain length of the PCP blocks, therefore, is a function of available monomer units per HTPB initiators. Because HTPB has an average of two hydroxyl groups from which PCP chain initiation begins, the average length of the PCP block which begins at each end of the HTPB unit is the number of available CL monomers divided by two times the number of HTPB units. Generally, in block polymers produced in accordance with the invention, the two flanking PCP blocks (together) comprise between about 30 to about 70 weight percent of the total polymer, with the polybutadiene block comprising the remaining 70 to 30 weight percent. A typical block polymer molecule might contain a 3000 MW polybutadiene block flanked by a pair of 1500 MW PCP blocks. However, block polymers with PCP block weight percentages outside of this range may be used in specialized applications. Desired weight percentages are controlled by the relative amounts of CL monomers relative to the number of initiator HTPB molecules.

For use in binders, block polymers are produced having number average molecular weights of between about 2000 and about 10,000 and preferably between about 3000 and about 8000. The polydispersity of the block polymers is preferably below about 2.5.

Preferred polybutadienes for forming the block polymers according to the invention consist predominantly of 1,4 butadiene chain addition mer units, 1,4 mer units preferably comprising about 60% of the mer units and more preferably about 80% of the mer units. Generally, trans additions predominate, trans additions typically representing at least about 65% of total 1,4 additions, and trans 1,4 additions typically representing at least about 50% of total butadiene unit additions. The percentage of trans relative to cis addition is not considered particularly critical to the properties of the block polymers or the elastomeric binders formed therefrom; however, it is preferred that the polybutadiene not be predominantly formed by 1,2 additions; and polybutadienes having greater than about 60% 1,2 additions are considered generally less suitable for purposes of the present invention.

The hydroxyl terminal moieties give the HTPB a functionality of about 2, and the block polymers which are produced by CL addition from the ends of the HTPB block likewise have a functionality in the range of about 2. Urethane-type curing is effected with isocyanates through the terminal hydroxyl groups of the polycaprolactone blocks. Because the block polymers have functionalities of about 2, the isocyanate curatives used to cure the block polymers preferably have a functionality of greater than 2 and preferably about 3 or greater in order to provide a significant degree of urethane-type cross-linkage in addition to chain extension. A suitable isocyanate resin composition useful as a curative is a mixed isocyanate resin sold under the tradename Desmodur N-100 having a functionality of about 3.6.

Propellants have been prepared in accordance with the present invention which demonstrate processibility, a range of hazards sensitivity of from 0 to about 150 cards, exceptional mechanical properties, e.g., strain greater than 300% at −65° F. 2 ipm, and good burning characteristics, e.g., a slope of 0.33. Of particular interest is the low-temperature strain which makes the binder particularly suitable for low-temperature applications, such as for propellant grains in missiles carried on the wing of an airplane. One surprising result of the present invention is that the apparent glass transition temperature ($T_g$) of the block polymer is about −70° C. (−94° F.), which is approximately the $T_g$ of the HTPB by itself. PCP, on the other hand, has a somewhat higher $T_g$, i.e., about −60° C. (−76° F.); nevertheless, the $T_g$ of the polymer as a whole closely reflects the $T_g$ of the block having the lower $T_g$ rather than an intermediate value. This is not to say that there is no phase change above −70° C., but that the block polymers retain good elastomeric properties down to -70° C. Low $T_g$'s are important not only from the standpoint of burning the propellant, e.g., firing a missile, at a low temperature, but for storage purposes as well. Exposure of a cast propellant formulation to temperatures below the $T_g$ of the binder could crack the same and result in misfiring of the grain, even if subsequently fired at temperatures well above the $T_g$.

The isocyanate curative is supplied as at least one equivalent of isocyanate per hydroxyl (NCO/OH), and preferably as at least 1.3 equivalents. An NCO/OH equivalency of greater than 1.0 is particularly important in formulations for propellants, explosives or the like where various species are present which may react with and therefore consume some of the available isocyanate moieties. The isocyanate curative generally comprises between about 0.5 and about 1.5 percent of the cured binder components, i.e., block polymer plus curative.

Curing is effected at elevated temperatures to promote relatively rapid curing. Typically, block polymers are cured with isocyanates at temperatures of 120°–130° F. (49°–54° C.) for a period of about 6 days.

In high-energy formulations, the block polymer is mixed with solids, including fuel material particulates, e.g., aluminum, and oxidizer particulates, e.g., ammonium perchlorate (AP), cyclotetramethylene tetranitramine (HMX) and cyclotrimethylene trinitramine (RDX); and nitrate ester plasticizers. Then, the isocyanate curative is added and the grain is cast, e.g., into a rocket motor casing, and curing is effected at appropriate temperatures and for appropriate time periods.

High-energy formulations typically contain between about 70 to 85% solids, including oxidizer particulates and fuel material particulates. The balance comprises the binder components, including the block polymer and the isocyanate curative, or a mixture of binder components and nitrate ester plasticizer. In high-energy formulations that contain nitrate ester plasticizers, the nitrate ester plasticizer is typically provided at a weight ratio relative to polymeric binder components (Pl/Po) of at least 2:1 and preferably at least 2.5:1.

The block polymers and the binders prepared from the block polymers in accordance with the invention retain the high miscibility with nitrate ester plasticizers characteristics of PCP and PCP-based binders. High-energy formulations using block polymers are compatible with nitrate ester-to-cured polymer weight ratios of 2:1 or above and in some cases 2.5:1 or above. The amount of nitrate ester which is retained by a block polymer-based binder depends, in part, on the relative proportions of the PCP and HTPB blocks.

An important advantage of PCP/HTPB block polymers in accordance with the invention is that the block polymers can be tailored to provide propellant formulations with certain sought-after characteristics. Generally, the properties of the block polymers are intermediate those of the PCP blocks and the HTPB blocks; however, by providing propellant formulations with particular combinations of intermediate values, propellants more suitable for certain purposes can be provided. Hydrocarbon polymers, such as HTPB, permit higher solids loading, but PCP is nitrate ester-miscible; in attempting to provide high energy propellant formulations there is a trade-off between solids loading and nitrate ester miscibility. PCP has a higher strain capability than HTPB, but a lower stress capability. HTPB has advantageously lower pressure exponents, burn rate slopes and temperature sensitivities than PCP.

From a practical standpoint, one of the more important trade-offs achieved by the block copolymers in accordance with the present invention is that of the relatively high specific impulse achieved with PCP-based propellant formulations and the low hazards sensitivities achieved with HTPB-based propellant formulations. PCP-based propellants have been produced having specific impulses as high as 272 seconds, whereas HTPB-based propellants have been produced only up to 266 seconds. Each second of specific impulse is considered to be quite significant. On the other hand, HTPB-based propellants have 0 cards sensitivity, i.e., are substantially immune to detonation. PCP-based propellants have specific impulses of 120 cards or above, making them highly susceptible to detonation. Specifications for propellant grains to be used in missiles for particular applications require low hazards. For example, many specifications require that the propellant be of the 1.3 class, i.e., having a hazard sensitivity of 69 cards or less. Clearly, HTPB-based propellant formulations meet this requirement; PCP-based propellant formulations do not, generally being in the 1.1 hazards class. Propellant formulations based upon PCP/HTPB block polymers have intermediate values of both hazards sensitivities and of specific impulses. However, the use of the PCP/HTPB block polymers permits propellant formulations to be produced at the upper end of the hazards range which defines a class, e.g., class 1.3, in which case the propellant formulation will be considered suitable for applications in which the low class (1.3) of hazards sensitivity is mandated and at the same time, the specific impulse is increased relative to an HTPB-based propellant formulation. Although the hazards standards for classes are in some senses arbitrarily defined, the flexibility provided by the block polymers in allowing maximization of specific impulses within a hazards class holds true, whereeever the cut-off of the class is assigned.

The invention will now be described in greater detail by way of specific examples.

EXAMPLE 1

Preparation of Poly(caprolactone)-Poly(butadiene)Poly(caprolactone) Block Copolymer (A-B-A)

A quantity of hydroxyl terminated poly(butadiene) polymer (733 g, 0.289 moles; Number Ave M Wt=1269 g/mole) which material is marketed by Arco Chemical Company as R45M0, dried and distilled caprolactone (1 Kg, 8.77 moles), and stannous octoate were placed in a 5-liter reaction vessel with removable three-neck top and equipped with a mechanical stirrer, heating mantle, thermometer and thermowatch, drying tube, and dry argon inlet. A gentle argon sweep was applied, and the reaction mixture was allowed to heat to 110° C. The reaction temperature was maintained between 110° and 115° C. for 24 hours. The polymer was poured into a glass container and allowed to cool to give a paste-like solid. Gel permeation chromography (Poly(glycoladipate) standard) gave a molecular weight (Number Average) of 7165 g/mole with a polydispersity of 1.62. Hydroxyl determination showed an equivalent weight of 2681, indicating a functionality of 2.7.

EXAMPLE 2

Poly(caprolactone)-Poly(butadiene) block copolymers synthesized by the procedure given in Example 1 are described by the physical property data shown in Table I.

TABLE I

| POLY(CAPROLACTONE) PREPOLYMER PROPERTIES | | | | |
|---|---|---|---|---|
| Prepolymer | Mw (g/mole) | Mw/Mn | Eq. Wt. (g/eq) | Functionality |
| $PCP_{25}$(R-45M) | 4710 | 1.81 | 1681 | 2.8 |
| $PCP_{40}$(R-45M) | 5460 | 1.75 | 2045 | 2.7 |
| $PCP_{60}$(R-45M) | 7165 | 1.62 | 2681 | 2.7 |

EXAMPLE 3

Glass transition data on these block copolymer systems is shown in Table II and shows that the R45M block determines the predominant glass transition of the PCP-R45M block.

| GLASS TRANSITION DATA FOR POLY(CAPROLACTONE) PREPOLYMERS[a] | | |
|---|---|---|
| ENTRY | PREPOLYMER | $T_g$ (°C.) |
| 1 | PCP0260 | −57 |
| 6 | $PCP_{25}$(R-45M)$_{75}$ | −71 |
| 7 | $PCP_{40}$(R-45M)$_{60}$ | −71 |
| 8 | $PCP_{60}$(R-45M)$_{40}$ | −71 |
| 9 | R-45M | −73 |

[a] Glass transition temperatures by Differential Scanning Calorimetry.

EXAMPLE 4

A comparison of propellant mechanical properties between PCP0260 and two PCP-R45M block copolymers is shown in Table III. This data demonstrates good general propellant properties with exceptionally good ambient and low temperature strain capability observed for the $PCP_{60}$(R45M) based system. Detailed formulation data is shown in Table IV. Although these PCP-R45M formulations have not been optimized for ambient stress capability, at present, they clearly out-perform the PCP0260 formulation in terms of strain capability.

TABLE III

PROPELLANT PROPERTIES[a]

| Property | Mix Number | | |
|---|---|---|---|
| | 1 | 2 | 3 |
| $\epsilon^{2.7}$ (psi) (77°) | 789 | 124 | 98 |
| $\sigma_m/\sigma_m{}^c$ (psi) (77°) | 70/152 | 24/54 | 40/214 |
| $\epsilon_m/\epsilon_f$% (77°) | 22/144 | 24/147 | 444/444 |
| $\epsilon_m{}^c$% (77°) | 138 | 147 | 447 |
| $\epsilon_m/\epsilon_f$% (−65°) | 18/44 | 14/98 | 305/305 |
| $\epsilon_m{}^c$% (−65°) | 20 | 98 | 305 |
| EOMV kp | 6.5 | 5.6 | 8.0 |
| Shore A | 51 | 19 | 13 |
| Prepolymer | PCP0260 | PCP$_{40}$(R-45M) | PCP$_{60}$(R-45M) |

[a]Propellant formulated with: NCO/OH = 1.4; Pl/Po = 2.3; Total solids = 75%; Des N100 curative; and polymer shown.

TABLE IV

PROPELLANT FORMULATIONS

| INGREDIENT | FORMULATION NUMBER | | |
|---|---|---|---|
| | 1 | 2 | 3 |
| PCP0260 | 6.336 | — | — |
| PCP$_{40}$(R45M) | — | 6.668 | — |
| PCP$_{60}$(R45M) | — | — | 6.846 |
| BTTN | 12.919 | 12.919 | 12.919 |
| TMETN | 4.306 | 4.306 | 4.306 |
| MNA | 0.25 | 0.250 | 0.250 |
| Al (60 micron) | 17.0 | 17.0 | 17.0 |
| HMX (20 micron) | 30.0 | 30.0 | 30.0 |
| HMX (3.2 micron) | 20.0 | 20.0 | 20.0 |
| AP (200 micron) | 8.0 | 8.0 | 8.0 |
| Des N100 | 1.154 | 0.821 | 0.643 |
| TPB | 0.010 | 0.010 | 0.010 |
| CAB | 0.025 | 0.025 | 0.025 |

Al = aluminum, MNA = N—methyl-2-nitroaniline, TPB = triphenylbismuth
CAB = cellulose acetate butyrate

EXAMPLE 5

The graph in FIG. 1 represents hazards properties (in cards on the ordinate) of an aluminized, reduced-smoke propellant formulated with PCP/HTPB copolymer and varying percentages of HMX (on the abcissa). Pl/Po=2.0. It can be seen that at low HMX percentages, the hazard sensitivity is relatively steady and within class 1.3. At a certain percentage of HMX, the hazard sensitivity rises rapidly and again plateaus. By selecting an HMX percent just below where the hazard sensitivity rises to 70 cards, a maximum HMX percent for a class 1.3 propellant is determined, thereby achieving a maximum specific imnmpulse for this particular formulation.

EXAMPLE 6

Figure 2:
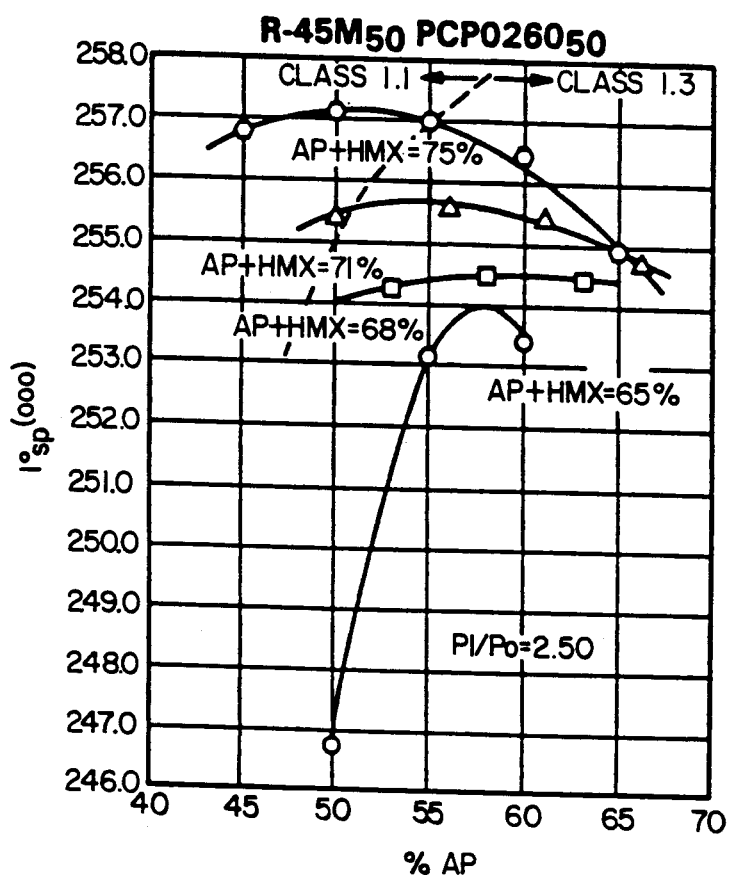
FIG. 2 is a graph representing hazards properties and specific impulses of propellant formulations with copolymers produced in accordance with the present invention and with various percentages of HMX and AP.

The graph in FIG. 2 plots specific impulse (on the ordinate) against solids composition for a reduced smoke propellant, nitrate ester-plasticized binder based upon R45M$_{50}$PCP0260$_{50}$. The plasticizer to polymer ratio is 2.50:1. Plotted on the absissa is % aluminum peroxide. The solid lines represent different percentages of HMX. The dotted line represents the dividing line between Class 1.1 and Class 1.3 propellants. Graphs, such as this, are useful in selecting solids percentages which maximize specific impulse and yet ensure that the propellant formulation qualifies as a class 1.3 propellant.

While the invention has been described in terms of certain preferred embodiments, modifications obvious to one with ordinary skill in the art may be made without departing from the scope of the present invention. For example, although formation of a block polymer has been described in terms of stepwise CL monomer addition from the hydroxyl termini of the HTPB molecule, preformed polycaprolactone blocks could also be chemically attached to the ends of HTPB molecules.

Various features of the invention are set forth in the following claims.

What is claimed is:

1. A propellant comprising between about 70 and about 85 weight percent solid particulates, including particulates of fuel material and oxidizer particulates and between about 15 and about 30 weight percent of a binder system comprising an elastomeric binder and nitrate ester plasticizer stably retained thereby, said elastomeric binder comprising a block copolymer having a central poly(butadiene) block and flanking poly(caprolactone) blocks, said poly(butadiene) block comprising between about 30 and about 70 weight percent of said block copolymer, balance of said block copolymer being said poly(caprolactone) blocks, and an isocyanate curative joining and cross-linking said block copolymer.

2. A propellant according to claim 1 wherein said poly(butadiene) block of said block copolymer has a number average molecular weight of between about 1000, and about 5,000.

3. A propellant according to claim 1 wherein said poly(butadiene) block has a polydispersity of less than about 2.

4. A propellant according to claim 1 wherein said block copolymer has a number average molecular weight of between about 2,000 and about 10,000.

5. A propellant according to claim 4 wherein said block copolymer has polydispersity of below about 2.5.

6. A propellant according to claim 1 wherein the weight ratio of nitrate ester plasticizer to block copolymer is at least about 2:1.

* * * * *